United States Patent [19]

Mintz

[11] 4,133,164

[45] Jan. 9, 1979

[54] SPLIT HORN ARRANGEMENT

[75] Inventor: Marcus Mintz, Chomedey, Canada

[73] Assignee: Industrial Knitting, Inc., St. Lawrence, Canada

[21] Appl. No.: 837,439

[22] Filed: Sep. 28, 1977

[51] Int. Cl.² .............................................. B65B 39/02
[52] U.S. Cl. .......................................... 53/261; 17/41
[58] Field of Search .................... 53/29, 35, 37, 138 R, 53/138 A, 183, 193, 197, 255, 257, 258, 260, 261; 17/41, 42

[56] References Cited

U.S. PATENT DOCUMENTS

| 2,393,102 | 1/1946 | Gribner | 53/258 |
|---|---|---|---|
| 2,402,869 | 6/1946 | Buchanan et al. | 53/261 |
| 2,823,503 | 2/1958 | Wolf et al. | 53/261 X |
| 2,865,157 | 12/1958 | Talsma | 53/35 X |
| 3,344,467 | 10/1967 | Barbu | 53/258 X |
| 3,389,533 | 6/1968 | Tipper et al. | 53/138 A |
| 3,726,059 | 4/1973 | Cherio et al. | 53/197 X |
| 3,935,691 | 2/1976 | Broch | 53/189 |
| 3,939,628 | 2/1976 | Schjeldahl | 53/29 |

*Primary Examiner*—Robert Louis Spruill
*Attorney, Agent, or Firm*—Charles E. Brown

[57] ABSTRACT

The invention relates to a split horn arrangement for packaging meat in a stretchable netting material, and to a method of packaging the meat using the split horn arrangement. In accordance with the invention, the split horn arrangement includes an upper member with depending side walls which overlap and cover upwardly extending side walls of a lower member so as to form a tunnel for passing the meat through. Disposed on the depending side walls are longitudinally extending rails which lift the netting material stretched over them so that the threads of the netting can be caught by the teeth of a pulling block to load the netting on the horn. The rails can also act as guides for the pulling blocks when loading the netting on the front end of the split horn. The pulling blocks include rows of fingers which grasp the lateral threads of the netting to pull the netting onto the horn.

7 Claims, 7 Drawing Figures

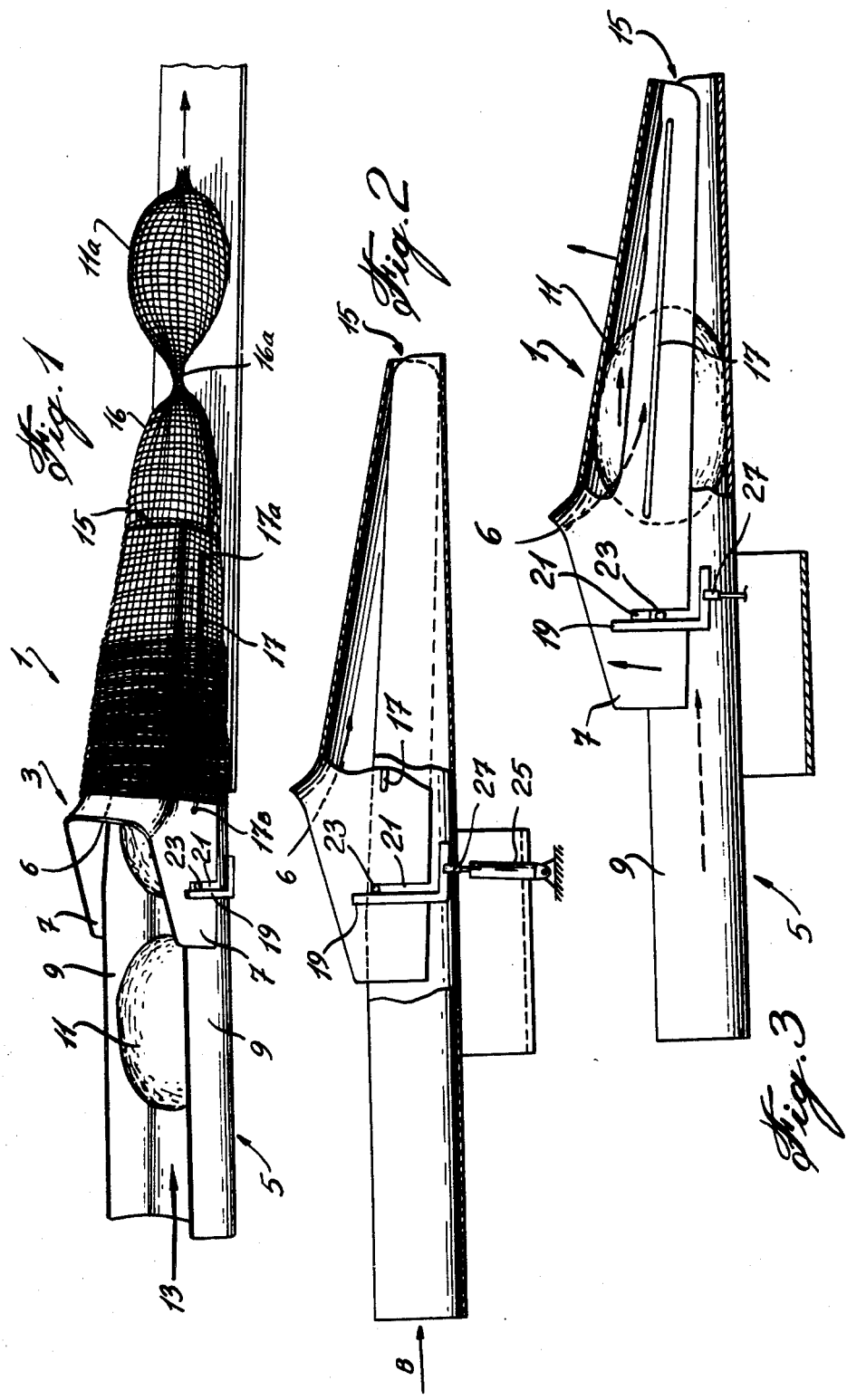

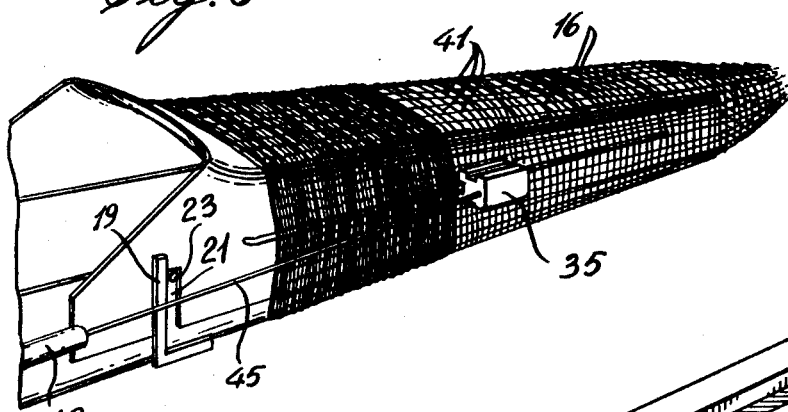
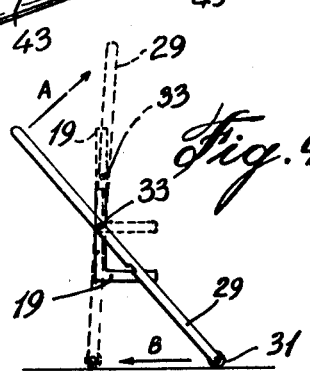
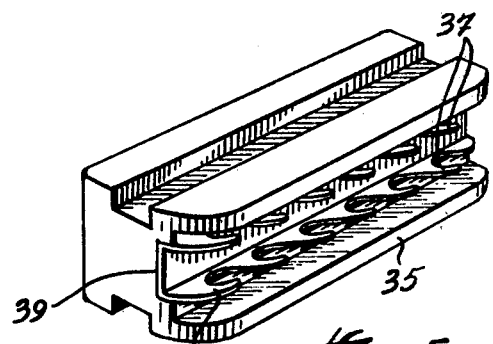
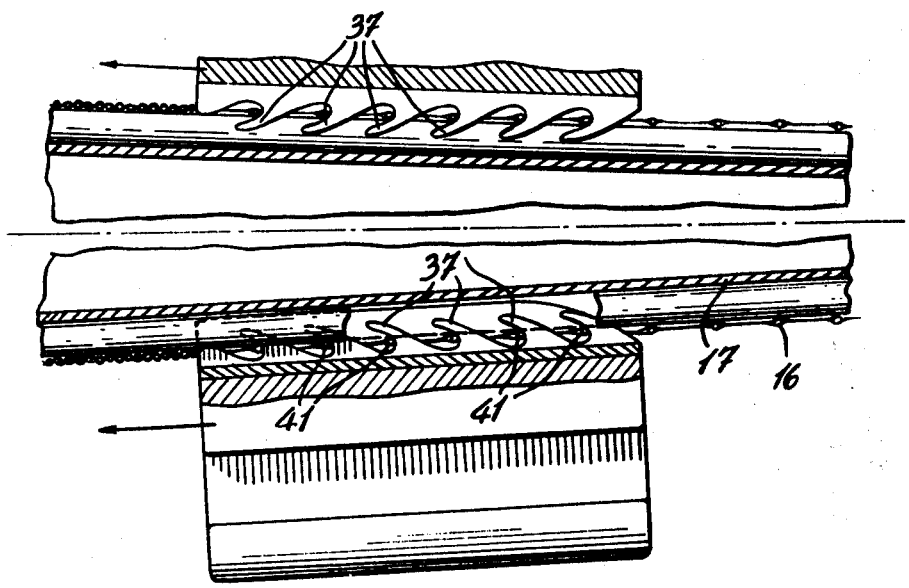

SPLIT HORN ARRANGEMENT

BACKGROUND OF THE INVENTION

1. Statement of the Invention

This invention relates to a split horn arrangement for packaging meat or like products into a stretchable casing material such as stretchable netting. The invention also relates to a method for packaging a product into the stretchable casing using the split horn arrangement.

2. Discussion of the Prior Art

It is known in the art to use horns for the purpose of packaging meat or like products in stretchable netting of the type taught, for example, in U.S. Pat. No. 3,513,668, Mintz, issued May 26, 1970 and assigned to the assignee hereof. Such horns are required to keep the netting in its open, receiving position while the meat is being inserted therein. With such arrangements, the netting is first stretched and pulled over the outside surface of the horn adjacent the front meat packaging (netting loading) end thereof. Meat is then inserted into the back (meat loading) end of the horn and pushed through a tunnel to the meat packaging end.

As the meat emerges from the tunnel from an upper member having depending side walls and a lower member having upwardly extending side walls, the netting surrounds and envelopes the emerging meat. Because of the elasticity of the netting, the netting will cling to the meat and move with it.

As will be appreciated, stretching the netting and loading the stretched netting onto the horn is a difficult process, especially when the tunnel must have wide openings to accommodate large pieces of meat. To reduce these difficulties, the split horn was developed.

With the split horn, the diameter of the tunnel is reduced while the netting is loaded. When the netting has been loaded, the horn is opened up (the tunnel is widened) to accommodate large pieces of meat. The netting will, of course, stretch to fit the larger tunnel size when the horn is opened.

There are several difficulties with the split horns as presently known: Because the netting is loaded by hand, it is difficult and time consuming to load the netting even on the closed horn. After the netting is loaded, and especially when a large amount of netting is loaded, opening the horn could be difficult. As the depending walls of the upper member of the horn is usually disposed within the upwardly extending walls of the lower member of the horn, meat could get stuck between the walls to clog the horn and hamper its operation. To overcome this difficulty, the depending walls are usually made to extend back to the meat loading end of the horn which is expensive and inconvenient.

SUMMARY OF THE INVENTION

It is therefore an object of the invention to provide a split horn arrangement for packaging a product in a stretchable casing material which overcomes the above disadvantages.

It is a more specific object of the invention to provide such a split horn arrangement wherein the side walls of the upper member overlap the side walls of the lower member.

It is an even more specific object of the invention to provide such a split horn arrangement with means for easing the loading of the casing material thereon.

It is an even more specific object of the invention to provide such a split horn arrangement with rails on the side walls of the upper member to ease the loading of the casing material.

It is a further object of the invention to provide a pulling means to be used in conjunction with the split horn arrangement.

It is a still further object of the invention to provide a method of packaging the product into the casing using the horn arrangement.

In accordance with the invention, a split horn arrangement for packaging a product into a stretchable casing material, said arrangement having a front end and a back end, comprises: an elongated lower member having upwardly extending side walls on both sides thereof; an elongated upper member having depending side walls on both sides thereof, said upper member being disposed over said lower member to define a tunnel therebetween and such that said depending walls overlap and cover respective ones of said upwardly extending walls; guide means permitting guided upward and downward movement of said upper member relative to said lower member; and means for loading said casing material on said arrangement at said front end thereof.

Said guide means may comprise: an L-shaped bracket mounted on each of said depending side walls such that the vertical part of the L is disposed vertically on its respective side wall, and such that the horizontal part of each L is disposed below the bottom edge of its respective side wall and in substantially parallel arrangement with said bottom edge; a vertically extending elongated slot in each said side wall disposed adjacent the respective one of said vertical part of said L's; and a pin mounted on each said upwardly extending walls, each pin being disposed in a respective one of said slots on said side walls; whereby, each said slot rides on its respective pin to permit guided movement of said upper member relative to said lower member.

Mechanical means for raising and lowering said upper member may comprise cylinder and piston combinations disposed on both sides of said depending walls and beneath respective ones of said L-shaped brackets, or they may comprise a lever attached to each one of said L-shaped brackets.

Said casing material normally comprises a netting having a plurality of lateral threads; and said arrangement may further comprise: an elongated rail extending longitudinally on each of said depending side walls; a pulling means for engaging each of said rails to be guided by its respective rail, and including means for graspingly engaging respective lateral threads, said pulling means being movable along the length of said split horn arrangement; whereby, when the pulling means grasps said lateral threads and is moved from said front end in the direction of said back end of said arrangement, said netting is pulled from said front end in the direction of said back end of said arrangement.

Said pulling means may comprise a block having a recessed surface therein; two spaced rows of finger means on said recessed surface; the spacing between said rows being greater than the width of said rails, and a piston and cylinder means may be attached to each one of said blocks for moving said blocks along the length of said arrangement.

From another aspect, the invention relates to a method of packaging a product into a stretchable casing material using a split horn arrangement having a front end and a back end, an upper member and a lower member disposed to define a tunnel therebetween, the upper member being movable upwardly and downwardly relative to said lower member, and means for loading the casing material on the front end of the arrangement; the method comprising the steps of: (a) loading casing material on the front end of the arrangement with a length of casing material extending beyond the front end of the arrangement; (b) raising the upper member; (c) loading a chunk of the product at the back end of the arrangement; (d) pushing the product through the tunnel so that it emerges from said tunnel at the front end of the arrangement, whereupon the product engages the length of casing material extending beyond the front end of the arrangement so that the casing material clings to the product and is pulled by said product during the forward motion thereof; (e) cutting said casing material at the rear end of said product after the product is fully emerged from said tunnel and fully packaged in said casing material, the casing material being cut at a point such that a length of casing material once again extends beyond the front end of the arrangement; (f) repeating steps (c) to (e) until all of the casing material loaded on the arrangement in step (a) is used up; (g) lowering the upper member; (h) repeating steps (a) and (b); (i) subsequently, repeating steps (c) to (e); (j) repeating steps (a) to (i) as required.

Normally, said casing material comprises a stretchable netting having a plurality of lateral threads, and said step (a) comprises: (a1) providing pulling means having fingers for graspingly engaging respective ones of said lateral threads; (a2) disposing a separate one of said pulling means on each of said depending side walls such that the fingers engage respective ones of said lateral threads of netting at the front end of said arrangement; (a3) moving said pulling means from said front end in the direction of said back end of said arrangement, whereby said netting is moved from said front end to said back end of said arrangement to be loaded on the front end of said arrangement; the pulling means being guided by rails extending longitudinally on said depending side walls.

BRIEF DESCRIPTION OF THE DRAWINGS

The invention will be better understood by an examination of the following description, together with the accompanying drawings, in which:

FIG. 1 is a perspective view of the novel split horn arrangement;

FIG. 2 is a side view of the arrangement in the closed position, and illustrating mechanical means for raising the upper member of the arrangement;

FIG. 3 is a side view of the arrangement in its open position;

FIg. 4 is an illustration of a lever arrangement which can be used to raise the upper member of the split horn arrangement;

FIG. 5 is an illustration of pulling means for loading the netting on the split horn; and FIGS. 6 and 7 illustrate how the pulling means operate in conjunction with the split horn for loading the netting.

DETAILED DESCRIPTION OF THE DRAWINGS

Referring to FIGS. 1, 2 and 3, the split horn, shown generally at 1, comprises an elongated upper member 3 and an elongated lower member 5. The upper member 3 includes side walls 7 depending downwardly on both sides thereof. The side walls 7 overlap upward extending side walls 9 of the lower member 5 to form a tunnel 6 between the upper and lower members. As can be seen, the walls 9 extend on both sides of the lower member.

A product, such as meat 11, is loaded at the back (product or meat loading) end 13, and is then pushed through the tunnel to emerge at the front (product or meat packaging) end 15 into netting 16, which, as well known, is stretchable and which includes a plurality of lateral threads 41. The front end 15 is also the casing or netting loading end as is well known.

About half way up the depending wall 7 is a longitudinally extending rail 17, which is provided for the purpose of lifting the netting off the surface of the wall 7 so that it can be grasped by a pulling means as will be discussed below. Such a rail is included on each of the side walls 7, and both of the rails extend in the same direction and for the same distance and can also be used as guides for the pulling means.

As above mentioned, the horn is in the closed position (as in FIGS. 1 and 2) when netting is loaded onto the netting loading end 15. However, when meat is being packaged, as seen in FIG. 3, it is necessary to open the horn by raising the upper member, again as shown in FIG. 3. To permit a guided raising of the top portion, i.e., in such a manner that the upper member can move upwardly and downwardly relative to the bottom member, but not forwardly, backwardly, or sidewardly thereof, the horn arrangement includes, on both depending side walls 7, an L-shaped bracket 19 fixed to each side wall adjacent a vertically extending elongated slot 21 therein. The slot rides on a pin 23, fixed on each upwardly extending side wall 9, whereby the upper member is guidingly movable upwardly and downwardly relative to the lower member.

Although the upper member may be manually movable as in FIG. 1, means may be provided to make it mechanically movable as illustrated schematically in FIGS. 2 and 3. In FIG. 2, a piston and cylinder arrangement 25, having a flat top surface connected to the moving piston, is disposed below the L-shaped bracket such that 27 is in contact with the horizontal part of the L. Means, well known, are provided for activating the piston and cylinder, and when the piston is raised, it will push the L bracket up thereby forcing the upper member upwardly with it. To lower the upper member, the piston and cylinder arrangement is activated to lower the piston.

Preferably, a piston and cylinder arrangement will be disposed on either side of the horn arrangement adjacent respective ones of the L-shaped brackets.

Another mechanical means for raising the upper member is illustrated in FIG. 4. This arrangement comprises a lever 29 having a roller 31 at the bottom end thereof. The lever is pivoted to the L-shaped bracket by means 33, such as a pin or the like. When the lever is moved in the direction of the arrow A, the roller 31 will move in the direction of the arrow B so that the point 33 must move upwardly, taking the bracket 19 with it. The lever will include means to lock it into place when it reaches its full upright position, as shown in dotted lines in FIG. 4. As can be seen, the L-shaped bracket, also shown in dotted lines, will be raised upwardly, taking the upper member with it.

Such levers can be included on both sides of the horn arrangement and attached to respective ones of the L-shaped brackets, and guide means, such as tracks, can be provided for guiding the rollers 31.

To aid the loading of the netting onto the netting loading end 15, use is made of a pulling means such as block 35 in FIG. 5. The block includes two spaced rows of netting engaging fingers 37, the rows being spaced by a distance somewhat greater than the width of the rail 17. The fingers may be disposed in a recess 39 of the block 35.

To load the netting with the pulling means, the pulling means is placed over the netting so that the fingers are adjacent the netting and make contact therewith, and such that the rail 17 rides between the two rows of fingers, as shown in FIGS. 6 and 7. As best seen in FIG. 7, the fingers 37 will grasp respective ones of the lateral threads 41 of the netting material, so that when the pulling means is pulled from the netting loading end to the meat loading end of the horn arrangement, it will pull the netting with it. With known methods, the netting is pulled up entirely by hand, and the loaders have to wear gloves to avoid hurting their hands. The loading is difficult and uneven and time consuming.

With the pulling means in accordance with the invention, loading is easier and more even, and less time consuming.

Pulling means would be provided on both depending side walls, and they can be operated by hand or by mechanical means, as shown in FIG. 7, which includes a piston and cylinder arrangement 43 with a shaft 45 connecting the piston of 43 to the block 35.

In operation, to load a product, such as chunks of meat 11, into casing material, such as netting 16, the netting, which is provided in cylindrical form, is disposed with one open end adjacent the netting loading end 15, and a length of netting is pulled over the front part of the horn. The pulling means is then put in operation by placing them, on either side of the horn arrangement, as shown in FIG. 7, on respective guide means 17 at the front ends 17A thereof. The fingers of the pulling means then engage respective lateral threads 41 of the netting material which is lifted from the side walls by the rails 17, to pull the netting with it, and the pulling means is pulled backward, in the direction of end 17B of the rail 17, and is guided by the rail during its travel. The pulling means is then moved away from the netting, to release the threads of the netting, and returned to position 17A, when it once again engages the netting material threads.

The above cycle is repeated until sufficient netting is loaded onto the horn. At that point, the upper member 3 of the horn arrangement is raised to permit large chunks of meat to pass through the horn. Because the netting is stretchable, it will expand as the horn opens. The meat is then pushed through the horn to emerge at end 15 thereof.

When the netting material is loaded, a length of netting remains in front of the end 15. Because of the elasticity of the netting, the netting will cling to the product as it emerges out of tunnel 6, and the product will pull the netting with it as it moves out of the tunnel. Thus, when the meat has fully emerged from the tunnel, as shown at 11A in FIG. 1, the meat will be fully encased by the netting. The netting is then cut at 16A to provide an individual, fully packaged, piece of meat, and to leave a length of netting extending beyond the front end 15.

After the loaded netting is all used up, the top portion is lowered, and a new length of netting is loaded on the horn, The packaging cycle is then repeated.

With the side walls 7 overlapping the side walls 9, there is no danger that the meat will be caught in the space between the adjacent side walls as is the case when the walls 9 overlap the walls 7. Accordingly, the side walls 7 can be made relatively short and do not have to extend to end 13 of the horn arrangement.

In addition, the provision of mechanical means eases the job of raising the upper member 3, and the provision of pulling means 35, to be used in association with rails 17, makes it easier to load the netting.

As can be seen in the drawings, the arrangement is preferably tapered to decrease in size towards the front end thereof. This permits the gradual stretching of the netting as it is loaded onto the front end of the horn so that the loading process is eased.

It is noted that one of the differences as between the prior art arrangement and the inventive arrangement is that, in accordance with the invention, the upper member 3 is raised to permit the passage of meat through the horn. However, when meat does not have to be passed through the horn, the upper member can be lowered to provide a relatively small area onto which the netting has to be pulled at the middle of the horn. Prior art devices are mainly pivoted at this point so that they have to, at all times, present a large enough area through which the passage of meat is possible. Accordingly, when loading the prior art devices with netting, it becomes very difficult to pull the netting onto this relatively large area. This difficulty, as can be seen, is overcome with the present device.

Although several embodiments have been described, this was for the purpose of illustrating, but not limiting, the invention. Various modifications, which will come readily to the mind of one skilled in the art, are within the scope of the invention as defined in the appended claims.

I claim:

1. A split horn arrangement for packaging a product into a stretchable casing material, said arrangement having a front end and a back end, and comprising:
   an elongated lower member having upwardly extending side walls on both sides thereof;
   an elongated upper member having depending side walls on both sides thereof, said upper member being disposed over said lower member to define a tunnel therebetween and such that said depending walls overlap and cover respective ones of said upwardly extending walls;
   guide means permitting guided upward and downward movement of said upper member relative to said lower member; and
   means for loading said casing material on said arrangement at said front end thereof;
   characterized in that said casing material comprises a netting having a plurality of lateral threads;
   said arrangement further comprising:
   an elongated rail extending longitudinally on each of said depending side walls;
   a pulling means for engaging each of said rails to be guided by its respective rail, and including means for graspingly engaging respective lateral threads, said pulling means being movable along the length of said split horn arrangement;
   whereby, when the pulling means grasps said lateral threads and is moved from said front end in the direction of said back end of said arrangement, said netting is pulled from said front end in the direction of said back end of said arrangement.

2. An arrangement as defined in claim 1, wherein said guide means comprises:
- an L-shaped bracket mounted on each of said depending side walls such that the vertical part of the L is disposed vertically on its respective side wall, and such that the horizontal part of each L is disposed below the bottom edge of its respective side wall and in substantially parallel arrangement with said bottom edge;
- a vertically extending elongated slot in each said side wall disposed adjacent the respective one of said vertical part of said L's; and
- a pin mounted on each said upwardly extending walls, each pin being disposed in a respective one of said slots on said side walls;
- whereby, each said slot rides on its respective pin to permit guided movement of said upper member relative to said lower member.

3. An arrangement as defined in claim 2, and further comprising mechanical means for raising and lowering said upper member.

4. An arrangement as defined in claim 3, wherein said mechanical means comprise cylinder and piston combinations disposed on both sides of said depending walls and beneath respective ones of said L-shaped brackets.

5. An arrangement as defined in claim 3, wherein said mechanical means comprises a lever attached to each one of said L-shaped brackets.

6. An arrangement as defined in claim 1, wherein said pulling means comprises a block having a recessed surface therein;
- two spaced rows of finger means on said recessed surface;
- the spacing between said rows being greater than the width of said rails.

7. An arrangement as defined in claim 6, and further comprising a piston and cylinder means attached to each one of said blocks for moving said blocks along the length of said arrangement.

* * * * *